S. J. SEELY.
Lime Kiln.
No. 9,736.
Patented May 17, 1853.
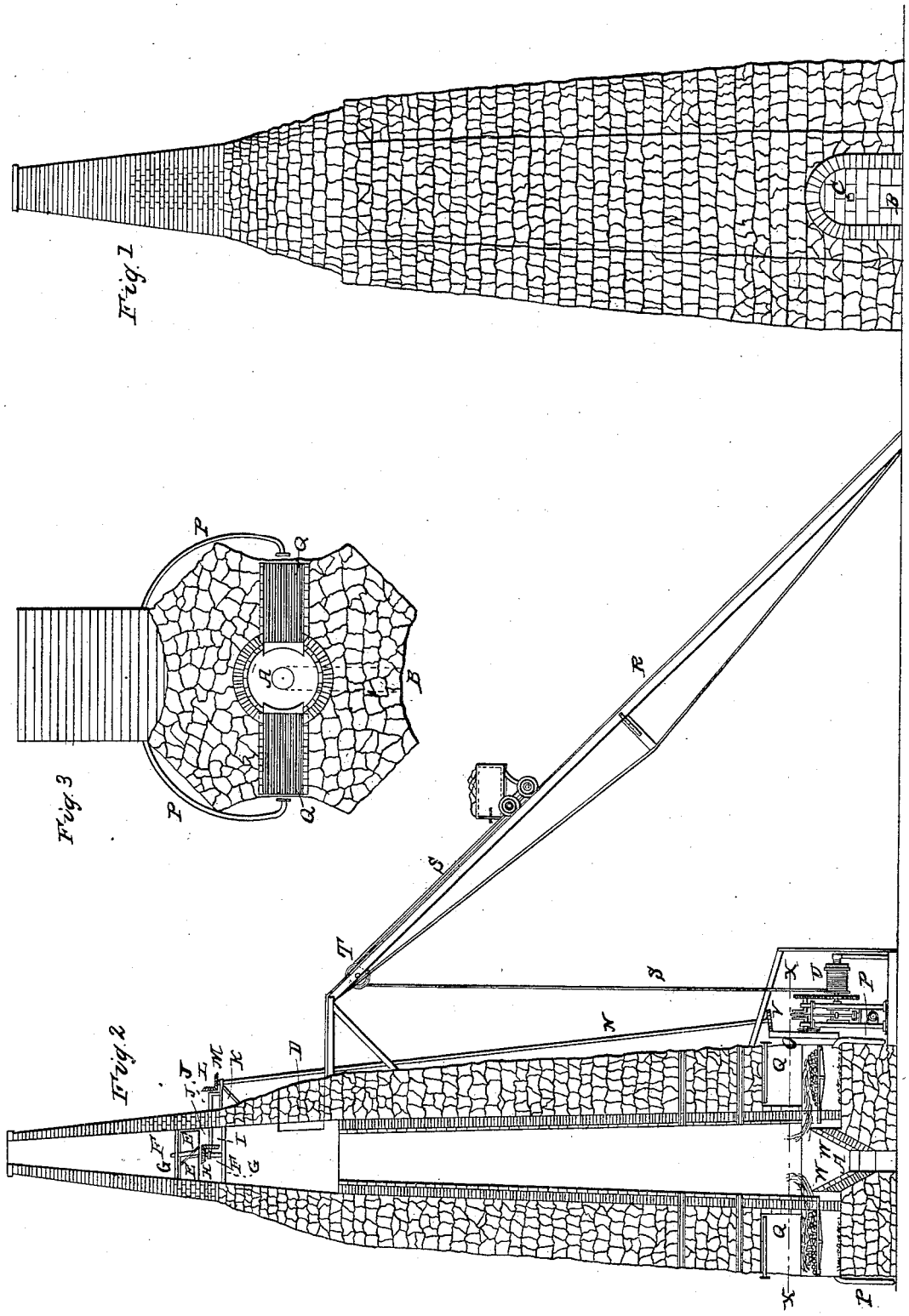

UNITED STATES PATENT OFFICE.

SAML. J. SEELY, OF NEW YORK, N. Y.

LIMEKILN.

Specification of Letters Patent No. 9,736, dated May 17, 1853.

*To all whom it may concern:*

Be it known that I, SAMUEL J. SEELY, of the city, county, and State of New York, have invented a new and useful process of calcining limestone by the aid of an artificial draft or blast of air and certain improvements in the adaptation and application of means to carry the same into effect, of which the following is a full, clear, and exact description, reference being made to the accompanying drawing, which makes part of this specification, and in which—

Figure 1 represents an elevation of the front of a kiln suitable for carrying my process into effect; Fig. 2 represents a vertical section through the kiln, showing also a steam engine and boilers, and part of a blowing and hoisting apparatus attached to the kiln, and Fig. 3 is a horizontal section of the kiln at the line $x$ $x$ of Fig. 2.

Heretofore it has been the practice to burn lime by means of a fire stimulated by the natural draft of the kiln alone. A brisk draft is indispensable to the maintenance of the combustion of the fuel at the proper degree of intensity to burn the stone thoroughly, and therefore the column of stone being calcined must be low, as the strength of the draft is inversely proportioned to its height. When the column of stone is low, it is highly heated throughout, and a large amount of heat is carried off at the top of the kiln with the escaping gases, involving a corresponding loss of fuel. If the column of stone to be calcined was kept so high that those portions which are newly fed in at the top will absorb the heat from the smoke and gases as they pass out, so as to reduce their temperature down to about that of the atmosphere, and thus save all the heat produced by the fuel, the draft would be diminished to an extent that would render the combustion too slow to be effective, and therefore in practice, the height of the column must be reduced and the draft increased, even at the expense of fuel.

The difficulties arising from a slack draft and slow combustion, have been to some extent remedied by mixing the limestone with coal, the column being composed of alternate layers of each. While this method obviates one difficulty, it causes another equally great, viz., the mixture of the cinders of the coal with the lime, the separation of which involves a large amount of manipulation—and this manipulation, even with the utmost care and precaution, causes the breakage of the lime to such an extent as greatly to lessen its marketable value—and as this separation can only be partial, the quality of the lime, is from that cause deteriorated, as it always sells for less when cinders are mixed with it, than when it is pure. Another objection to this method of maintaining a brisk fire is, that as the coal always contains more or less iron, and earthy matter, which the lime fluxes, a glassy cement is formed which joins lumps of lime, cinders, etc., into masses of concrete which are difficult to withdraw from the kiln, and of but little value when withdrawn. Moreover as the natural draft of a kiln is influenced by the state of the wind, the humidity of the atmosphere, and other causes, the fire will in the same degree burn irregularly, at times supplying too much heat, and at other times too little, so that the calcination of the lime will at one time be deficient, and at another, it will be carried to the extent of vitrification. It is also plain that the quantity of air passing into kilns of the usual construction cannot be increased beyond the amount of the natural draft, and if that proves to be insufficient the deficiency must remain unsupplied.

The object of my improved process is to remedy these defects and it consists in a method of calcining limestone by the aid of an artificial draft of air maintained in the kiln, by means of a mechanical blower.

My invention further consists in the arrangement of a suction blower at the top, and a forcing blower at the bottom of the kiln, in such manner, that when the aperture at the bottom of the kiln for the withdrawal of lime, or that for the introduction of fuel into the grates, is opened, the lower blast may be stopped, and that at the top put in action, in order that the blast of the kiln may be maintained steadily while it is open at the bottom, without danger of the heated smoke and gases rushing out at the openings and burning the attendants, because the suction at the top, will produce a partial vacuum in the lower part of the kiln sufficient to cause a current of air to flow in at every opening, by which means the workman will be protected from all danger of being either suffocated or burned by the outrushing of the heated gases.

When the top of the kiln is opened to receive the stone, or for other purposes, if there should not be any other than the suction blower, the draft at the bottom of the kiln would cease until the top was closed again, as the air would rush in to supply the blower at the charging door, instead of being drawn in through the furnaces at the bottom; this renders a blower both at the top and bottom of the kiln indispensable.

The next part of my invention consists in generating the steam power for maintaining the artificial blast, by the same furnaces that supply the heat by which the stone is calcined, thereby saving the expense and labor of maintaining separate fires, by making the kiln furnaces also the boiler furnaces, and as large or small fires will be kept in the furnaces, as more or less heat is required in the kiln, more or less steam will be generated, as more or less is required to maintain a blast proportionate to the amount of fire, and there will be no danger of the kiln being cooled down by a blast of cold air, in case the furnace fire should happen to go down, because the slackening of the fire in the furnace slackens the generation of steam, lessens the power of the engine, and diminishes proportionally the strength of the blast, so that if the fire should go out, the blast would cease altogether.

The accompanying drawings represent a kiln adapted to the calcination of limestone by my improved process. The body of the kiln in this instance has the form of a frustum of an octagonal pyramid, surmounted by a top or chimney in the form of a frustum of a cone. The body of the kiln is built of stone and every alternate side is made concave so that the flat sides, may be the most protuberant, and act as buttresses to strengthen the walls. The top is built of bricks. The interior of the body of the kiln is conical, and is lined with bricks, and I prefer to leave a space of about six inches between the lining and the wall which I fill with loam not packed in too hard. This loam being a bad conductor will tend to prevent the transmission of heat from the lining to the wall of the kiln, and will also allow the lining to expand and contract without straining the walls as if they, and the lining were in contact. The bottom of the interior of the kiln is shaped like a funnel to conduct the lime into a narrow well (A) from which it is withdrawn through an opening (B) as fast as it is produced by the calcination of the stone. An eye (C) is made through the wall just above the bottom (W) and over the discharge aperture for the introduction of an iron bar to dislodge any accretion of lime and cinders that may hang between the walls and obstruct the descent of the lime above it to the well. The top of the kiln has a charging hole or opening (D) in its side through which the limestone is introduced, and this charging hole is fitted with a door by means of which it can be closed when the kiln is not being fed, in order to increase the natural draft, by preventing the access of air except at the bottom. The heat by which the limestone is calcined, is supplied by one or more furnaces at the bottom of the kiln. For a kiln of medium size, say about seven feet internal diameter at the base, two furnaces will answer very well, for a large kiln three or four furnaces would diffuse the heat better and insure a more perfect calcination of the stone.

When two furnaces are used as represented in the drawing, they should be placed on opposite sides of the kiln, and the fire-box and ash-pit should both be tightly closed by doors which can be opened to introduce fuel or to withdraw ashes. The door of the fire-box should be closed the instant the fuel has been introduced, but the door of the ash-pit may be closed or left open, as it is, or is not required to admit air through it to support the combustion of the fuel. If the draft of air through the fire is created by a suction blower at the top of the kiln, the door of the ash-pit must be left open, but if the blast is forced through the fire instead of being drawn through, then the blast pipe must enter the ash-pit and the door of the latter must be closed to prevent the air from escaping thereat, instead of passing through the kiln. For the purpose of creating this artificial draft I employ any known kind of blower. In this instance I have represented a fan blower for the top or suction blast, and another for the bottom or forced blast of the kiln. The suction fan (E) is mounted in the chimney, above the charging door, on an upright spindle (F) placed in the axis of the chimney, which is round. The spindle (F) is supported by bars (G) placed across the chimney. On the lower part of the spindle of the fan a bevel wheel (H) is secured which is driven by a second bevel wheel (I) on a horizontal shaft (J) that passes through the side of the chimney to a suitable bearing in a bracket (K) on the outside. On the outer end of this shaft a second bevel wheel (L) is secured which gears into a bevel wheel (M) on the end of an upright shaft (N) which extends down to the engine and is turned by a pinion (V) on its lower end that gears into cog-teeth on the side of the balance wheel (O). In this way the fan in the chimney has a rapid rotary motion communicated to it producing a partial vacuum beneath it in the top of the kiln, which aided by the natural draft of the kiln causes the air to rush in at the ash-pit door or any other opening in the lower part of the kiln. The charging door (D) must be kept closed while the suction fan is in operation, otherwise the vacuum created by the fan would be filled by air passing in at this door, instead of the lower part of the kiln. The blower to force the air in at the bottom of the kiln has pipes (P) leading from it in the usual manner, which are extended to the ash-pits of the furnaces and there terminate, and discharge the air.

As the manner of constructing blowers, connecting them with the engine by which they are driven, and adapting pipes to them to convey the blast they generate to the point at which it is to be applied, is illustrated in iron foundries, I have deemed a particular description of the same in this connection unnecessary, as it would not impart any knowledge to a competent constructor, that he does not already possess, and I would also make the same remark with regard to the steam engine which has been referred to.

The boilers (Q) for generating steam to supply the engine are set in the arches of the furnaces, immediately over the fire-box, so that the same fire which furnishes the heat to calcine the stone, also heats the boilers to generate the steam required to drive the engine. In this way the motive power will easily be kept in due proportion to the duty required of it, for when little fuel and a low fire are required, as when but little lime is drawn from the kiln, there will be but little steam generated, the engine will work slow and there will be a weak blast, and in case the fuel should all be consumed and the fire go out, the steam at the same time will go down, and the blast will cease, thus avoiding all danger of the kiln being cooled by a continuance of the blast, as would be likely to happen in case the boiler was provided with a separate furnace. As these boilers are constructed in the usual way and set in their furnaces as they commonly are in those for other purposes, I deem a particular description thereof unnecessary.

The limestone must be broken into small lumps preparatory to calcination, and then conveyed to the top of the kiln and charged into the same as may be required, to keep the body of the kiln full. To facilitate the elevation of the stone an inclined railway (R) is raised against the side of the kiln; the foot of this inclined railway connects with horizontal railways leading off to the heaps of broken limestone for the supply of the kiln. These railways are provided with one or more cars so constructed that their boxes will stand level while they are ascending the inclined plane. The elevation of the car with its load of stone up this inclined plane is effected by means of a rope (S) passed over a pulley (T) at the head of the inclined plane and descending to a windlass (U) turned by the steam engine. The descent of the car is regulated by a brake applied in the usual manner to the barrel of the windlass. The only attention requisite in feeding the kiln is to keep it full of broken stone by charges fed in at short intervals. The fire in the furnaces must, for the greatest efficiency, be urged as much as can be done without vitrifying the limestone, in order to accelerate the process of calcination. When the burning is thus urged the lime must be drawn out at short intervals to remove it from the fire as fast as it is produced, which as every practical lime-burner knows is as fast as the carbonic acid is expelled from the stone by the heat, so that upon being moistened with water it will slake into powder. It is important to draw the lime as fast as it is produced, because to keep it heated after the calcination is complete involves a waste of fuel. In order that there may be the least possible waste of fuel from this cause the stone when introduced into the kiln must be reduced as near as may be to a uniform size in order that the calcination of the whole may be completed simultaneously, for if there were great inequality in size the smaller pieces would be calcined before the larger ones, but the heat of the small ones would have to be maintained until the calcination of the large ones was completed.

The kiln and its appendages if constructed and arranged in the manner herein described will answer a good purpose, but it is quite obvious that without any departure from the principle of my invention an unlimited number of changes may be made either by the modifications of the parts I have described, or by the substitution therefor of others which would be their equivalents for the performance of their respective functions in carrying into effect my improved process. As these things will naturally occur to the engineer who may be constructing a kiln so as to enable him to adapt the same to the particular circumstances of the occasion, I deem further description unnecessary.

What I claim as my invention and desire to secure by Letters Patent, is—

1. The process herein described of calcining limestone, in a kiln, by the aid of furnaces and an artificial draft of air through the furnaces and the kiln, maintained by a mechanical blower, substantially as herein set forth.

2. I also claim the combination of a suction blower at the top of the kiln, and a forcing blower at the bottom thereof, substantially as herein set forth.

3. I also claim the method of regulating the production of steam to generate the power for the engine in proportion to the duty required of it, by setting the steam boiler in the same furnace that supplies the heat for calcining the limestone, substantially as described.

In testimony whereof I have hereunto subscribed my name.

SAML. J. SEELY.

Witnesses:
P. H. WATSON,
A. E. H. JOHNSON.